United States Patent [19]

Herter

[11] Patent Number: 5,143,699
[45] Date of Patent: Sep. 1, 1992

[54] MIXING APPARATUS

[75] Inventor: Rainer Herter, Waldwick, N.J.

[73] Assignee: Werner & Pfleiderer Corp., Ramsey, N.J.

[21] Appl. No.: 215,269

[22] Filed: Jul. 5, 1988

[51] Int. Cl.⁵ ............................................. B01F 7/08
[52] U.S. Cl. .................................... 422/163; 366/83; 366/287; 422/229
[58] Field of Search ................. 422/135, 163, 229; 425/207; 366/83, 287

[56] References Cited

U.S. PATENT DOCUMENTS

| | | | |
|---|---|---|---|
| 3,630,689 | 12/1971 | Wheeler et al. | 422/135 |
| 4,005,853 | 2/1977 | Kimmel | 366/83 |
| 4,493,630 | 1/1985 | Muller et al. | 366/83 |
| 4,702,695 | 10/1987 | Blach | 366/83 |

FOREIGN PATENT DOCUMENTS 1289301 2/1969 Fed. Rep. of Germany ........ 366/83

Primary Examiner—Peter Kratz
Attorney, Agent, or Firm—John D. Kaufmann

[57] ABSTRACT

Apparatus for processing materials within a bore is disclosed to provide separation of the bore-defining elements without any relative movement between surfaces which are in engagement. Such lack of relevant movement precludes generation of frictional forces which may have catastrophic results where materials being processed are volatile or unstable such as explosives.

12 Claims, 5 Drawing Sheets

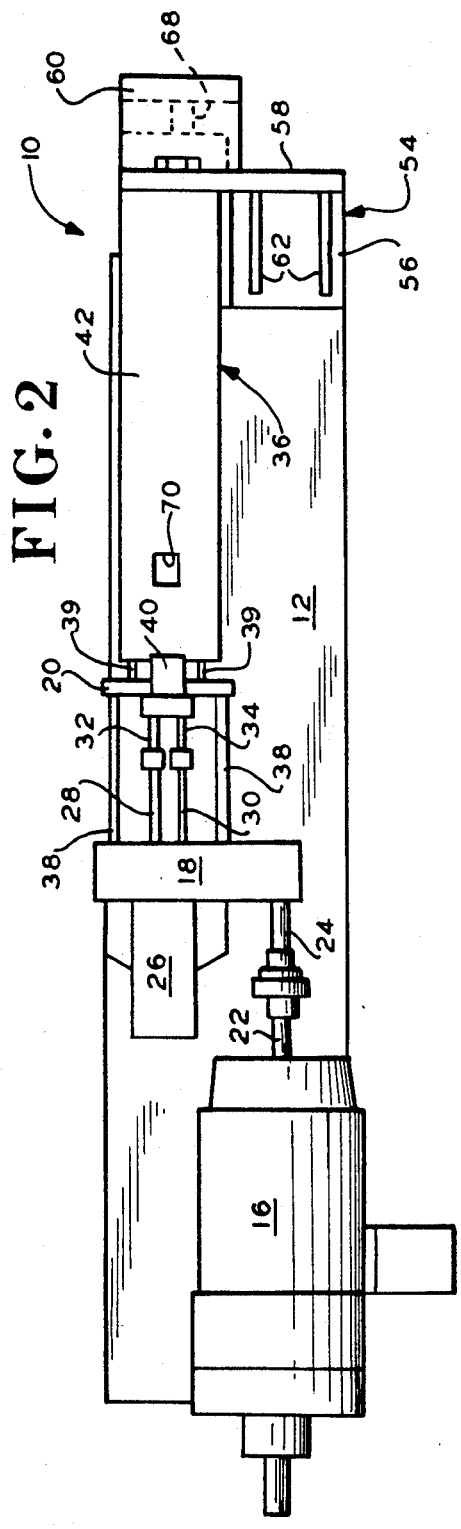
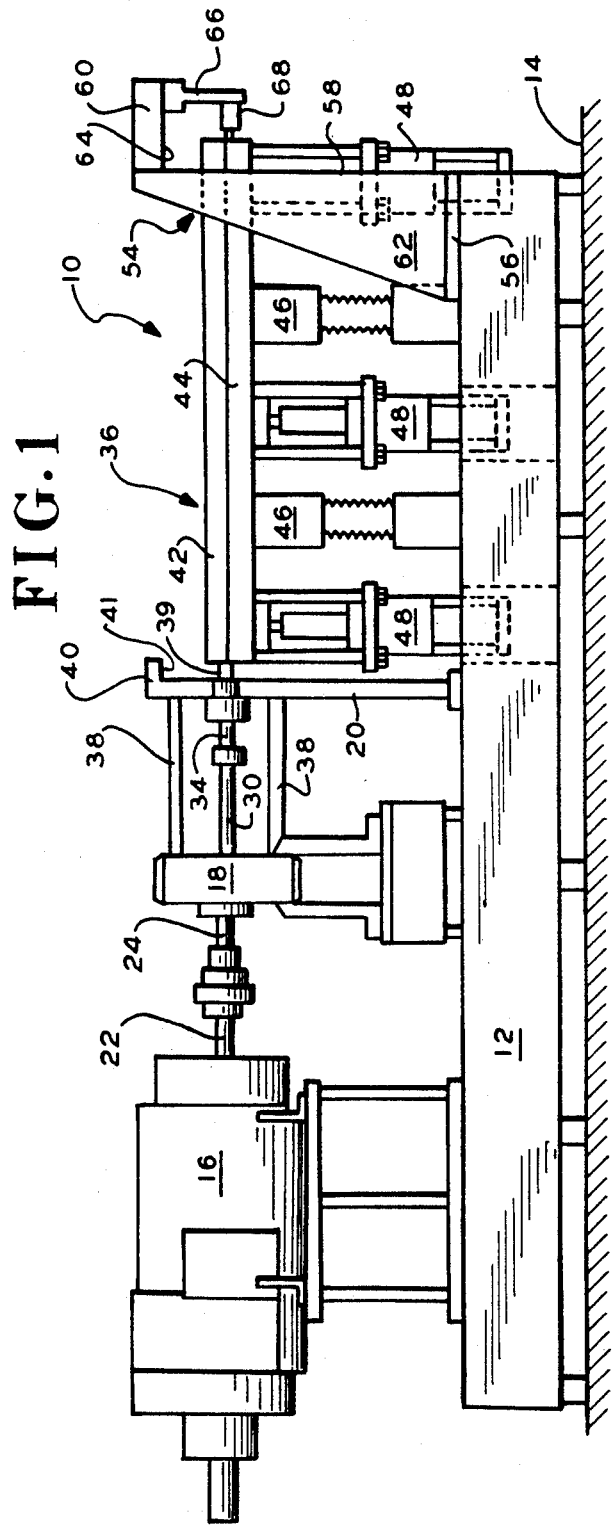

MIXING APPARATUS

BACKGROUND OF THE INVENTION

This invention relates to apparatus for continuous mixing. More particularly, this invention relates to apparatus for continuous mixing where the material being mixed is unstable such as explosives and the like.

Apparatus for continuously mixing, blending and/or extruding have been developed over the years and utilized in many continuous processing systems. Such apparatus have been used in such diverse applications as polymer manufacture, compounding and finishing systems, rubber mixing, grafting and degasing, food processing and hazardous waste solidification. Other applications have included fossil fuel pelletizing and agglomeration, and the continuous production of adhesives, powder coatings, catalysts and the like.

A particular challenge to those concerned with the design and manufacture of continuous mixing equipment is the challenge presented by the mixing of unstable materials such as explosives. For example, the manufacture of plastic-bonded explosives (PBX) involves the mixing of a liquid polyester matrix with explosive material in pellet or granular form to provide a homogeneously mixed product. There must be a consistent dispersion of the explosive material in the matrix and no reduction in the explosive grain size. In achieving an acceptable product, care must be taken not to cause shear stresses in the explosive material beyond defined limits because exceeding such limits may well result in detonation of the explosive material with catastrophic results.

Known continuous mixing equipment is not particularly well suited for these applications. They operate based upon pressure generation, mixing and kneading to create desired shear and mixing intensities. There are structured relationships in the equipment such as at hinges and bearings where high shear forces may be exerted in the product being processed, which forces are unacceptable in handling explosives and other unstable materials. Very specific problems include the inability to quickly open the process section so as to avoid pressure build-up or excessively high temperatures, as well as difficulty in cleaning the equipment, particularly the bearings and hinges.

In most known continuous mixers, the bearings which support the mixing screws for rotation are mounted on or integral with the barrel structure. As a result, product being mixed often gets into the moving bearing elements. Although this may not be a problem for mixing some materials, this is a very definite problem for materials such as explosives because any explosive material which enters the bearing and becomes subject to the moving parts may experience shear stresses which exceed the explosive limit with predictable and catastrophic results.

With regard to cleaning, some mixers are disassembled for cleaning by removing the screws from the barrel. Others have axially split barrels with the sections being hinged together so as to rotatably swing away from the screws. Again, while acceptable for some materials, such structures are not desirable for materials such as explosives. Removal of the screws from the barrel often is accompanied by the screws accidentally striking the barrel surface. Where the mixer has been used to mix explosives there is a residuum of explosive material which may well be detonated by the striking of the screws against the barrel. As to hinged barrel sections, they are subject to having explosive material find its way into the hinge mechanisms which, in response to rotation of the hinges, may detonate.

Another problem with other known mixers is that the flow-path of the material through the apparatus is such that dead spots are formed, i.e., spots where there is no continuous movement thus increasing the residence time of the material. Increased residence time is unacceptable as it increases the amount of energy added to the material which may lead to degradation and detonation.

For the foregoing reasons, most mixing of explosive and otherwise unstable materials occurs by batch mixing. The products are mixed in batches ranging from five to ten thousand pounds per batch. This, of course, is a long and tedious process and far inferior to continuous mixing.

SUMMARY OF THE INVENTION

It is an object of the present invention, therefore, to provide an apparatus for continuous mixing which is uniquely useful for the mixing of explosives.

Another object of the present invention is to provide an apparatus for continuous mixing which minimizes the likelihood of the occurrence of surface-to-surface moving contact between components of the apparatus.

Yet an additional object of the present invention is to provide a continuous mixing apparatus wherein the mixing screws are supported for rotation by bearings which are remote from exposure to the product being mixed.

A further object of the present invention is to provide an apparatus for continuous blending in which the barrel of the process section may be separated from the mixing screws selectively or automatically in response to the occurrence of pre-determined process conditions.

Still another object of the present invention is to provide an apparatus for continuous blending where the barrel may be separated from the mixing screws for service and cleaning without axial removal of the screws and without the use of hinges or other structures which create opportunities for the generation of high shear stresses in materials being mixed with the attendant danger of catastrophic results.

These objects and other objects not enumerated are achieved by a mixing apparatus according to the present invention, an embodiment of which may include a driving means, a processing section having first and second barrel sections, a mixing screw operatively connected to the driving means and means for displacing the first and second barrel sections between a closed position and an open position without relative movement between any surface of said first and second barrel sections which are in surface-to-surface contact.

BRIEF DESCRIPTION OF THE DRAWINGS

A more complete understanding of the present invention may be had from the following detailed description of a preferred embodiment, particularly when read in the light of the accompanying drawings wherein:

FIG. 1 is an elevational view of a continuous mixer according to the present invention;

FIG. 2 is a plan view of the mixer of FIG. 1;

DETAILED DESCRIPTION

Figure 3:
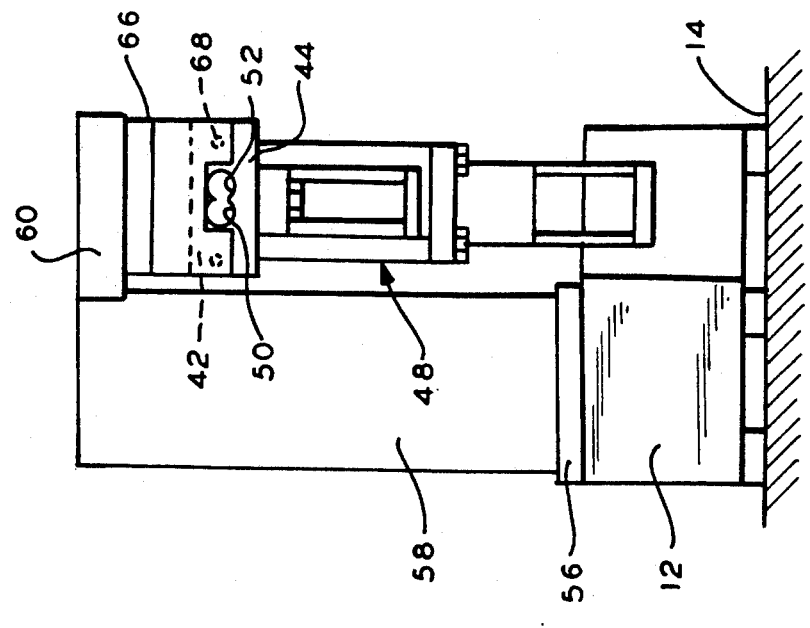
FIG. 3 is an end-view of the barrel end of the mixer of FIG. 1.

Referring, therefore, to the drawings, and in particular to FIGS. 1-3, there is shown an apparatus for continuous mixing structure in accordance with the present invention and designated generally by reference numeral 10. As will be recognized by those skilled in these arts, apparatus 10 is depicted generally and the figures do not show details of the device such as gauges, hydraulic lines, switches and the like, all of which may be chosen from the many which are commercially available and the operation of which is generally known to those skilled in these arts. Further, the hydraulic system for operating apparatus 10, which forms a part of the invention, is discussed in detail hereinafter. What is depicted, however, when considered in light of the following detailed description, clearly is sufficient to permit those having ordinary skill in these arts to make and use continuous mixing apparatus incorporating the features of this invention.

Thus, apparatus 10 can be seen to include a base frame 12 which is suitably supported by a floor 14 of adequate load-bearing capacity. Base frame 12 serves as a rigid support for a motor 16, a reduction and distribution gear mechanism or gearbox 18 and an inboard bearing support member or lantern 20. Motor 16 may be a standard variable speed motor (frequency-controlled AC, rectifier-controlled DC or a hydraulic motor and drive) mounted and coupled in any of the methods well known in these arts.

The output shaft 22 of motor drive 16 is suitably coupled to the input shaft 24 of gearbox 18 which establishes a preselected ratio of rotational speed between the motor 16 and a pair of output shafts 28 and 30. Linear loads generated through shafts 28 and 30 are carried by a thrust bearing 26 mounted on gearbox 18.

The output shafts 28 and 30 of gearbox 18 are coupled, e.g., by splining, to the drive ends of a pair of mixing screws 32 and 34, respectively.

Mixing screws 32 and 34 are rotatably supported by suitable bearings mounted in lantern 20. The bearings may be selected from any of the many known to those skilled in these arts. However, in the embodiment shown in FIGS. 1-3, mixing screws 32 and 34 are supported for rotation only at bearing support member 20 with the major portions of the lengths of the shafts being cantilevered within the lines of a process section 36 as is described below. Accordingly, the bearings mounted in lantern 20 must be suitable for that purpose.

Bearing support member 20 is mounted on and rigidly secured to baseframe 12. Further, bearing support member 20 is rigidly secured to the casing of gearbox 18 by a plurality of rods 38. Integral with bearing support member 20 and disposed at its upper end is a first stop means 40, the purpose of which is discussed below. First stop means 40 extends toward and over process section 36.

Rigidly secured within lantern 20 are a pair of locating pins 39 which extend into suitable bores in the process section 36, the axes of which bores are coplanar with the axes of mixing screws 32 and 34.

Process section 36 comprises an upper barrel section 42 and a lower barrel section 44. Barrel sections 42 and 44 are supported above baseframe 12 by four spring assemblies 46 (two shown), the detailed structure of which is disclosed below. When process section 36 is in operational configuration, the lower or mating surface of upper barrel section 42 is in surface-to-surface engagement with the upper or mating surface of lower barrel section 44. The plane defined by this surface-to-surface or mating engagement is generally parallel to the surface of floor 14. When it is desired or required to separate upper barrel section 42 from lower barrel section 44, e.g., for cleaning or to avoid build-up of unacceptable or potentially catastrophic pressures and/or temperatures within the process section, separation of the barrel sections 42, 44 is achieved through the operation of a plurality of hydraulic cylinder assemblies 48 (three shown), the structures and operation of which are discussed below in detail. Hydraulic cylinder assemblies 48 are secured to and supported by the upper barrel section.

The lower surface of upper barrel section 42 and the upper surface of lower barrel section 44 are each machined to define two semi-cylindrical surfaces that form two longitudinally extending cylindrical bores when the surfaces are engaged. Thus, when the process section 36 is in operational configuration, as is shown in FIGS. 1-3, the semi-cylindrical surfaces in upper barrel section 42 cooperate with similar surfaces in lower section 44 to define longitudinally extending, overlapping parallel bores 50 and 52. In this regard, bore 50 receives mixing screw 34 coaxially therein and bore 52 receives mixing screw 32 coaxially therein. Mixing screws 32, 34 extend into and through bores 52 and 50 from their ends adjacent lantern 20 to a point just short of the opposite ends of bores 50 and 52. In an alternative embodiment of the invention (not shown), the mixing screws 32 and 34 extend completely through bores 52 and 50 respectively to be received in support bearings located at a position spaced from the end of process section 36. It should be noted that at no time during the operation of apparatus 10 do mixing screws 32 and 34 come into contact with the material of upper barrel section 42 or lower barrel section 44. Further, there is never any relative movement between upper barrel section 42 and lower barrel section 44 when their respective lower and upper surfaces are engaged. As a result, the operation of apparatus 10 does not involve any relative movement between any surface of the upper and lower barrel sections which are in surface-to surface contact. This is most importantly so in areas where materials being processed are present. This is particularly important where the materials being processed are unstable such as explosives and the like.

Rigidly secured to the right end of baseframe 12 as seen in FIG. 1 is end frame 54. End frame 54 includes a bed plate 56 which is rigidly secured to baseframe 12, a vertical support plate 58 which is secured to bed plate 56 and extends upwardly to a position above process section 36, and a horizontal support plate 60 which is disposed above process section 36. Vertical support plate 58 is rigidly secured to bed plate 56 and retained in vertical position by a pair of generally triangular gusset plate 62. For purposes that are discussed below in detail, the lower surface 64 of horizontal support plate 60 is coplanar with the lower surface 41 of first stop means 40 on lantern 20. Suspended from the lower surface 64 of horizontal support plate 60 is support plate 66. In the embodiment shown, support plate 66 supports a pair of locating pins 68 which cooperate with recesses found in the lower and upper surfaces of upper and lower barrel sections, respectively, to properly locate and position the respective barrel sections during operation. In this regard, locating pins 39 which are disposed in lantern 20 serve the identical purpose with respect to ends of upper and lower barrel section 42, 44 adjacent to the bearing support section. The use of such pins as locating devices and the particulars of their construction are well known to those skilled in these arts. In apparatus 10, however, locating pins 39 and 68 also serve as support means for supporting upper barrel section 42 and its associated hydraulic cylinder assemblies 58. The locating pins 39 and 68 also serve as reaction means against which lower barrel section 44 bears during the closing cycle of process section 36.

Formed through the upper surface of upper barrel section 42 is an opening 70 which defines the feed port for introducing materials to be processed into bores 50 and 52 of process section 36. It will be recognized that more than one feed port may be utilized. Further, known devices such as injection means can be utilized to introduce other materials to be processed.

In the embodiment shown, processed materials are discharged through the open ends of bores 50, 52 adjacent end frame 54. Processed materials so discharged may fall into a container, fall onto a conveyor belt or otherwise be handled based upon the requirements of the material being handled and the end product desired. It will also be recognized by those skilled in these arts that a die plate may be mounted on the end of process section 36 such that materials discharging from bores 50, 52 can be passed therethrough and shaped, separated or otherwise formed based upon the particular configuration of the die plate. Utilization of such die plates is well known to those having skills in these arts.

Figure 5:
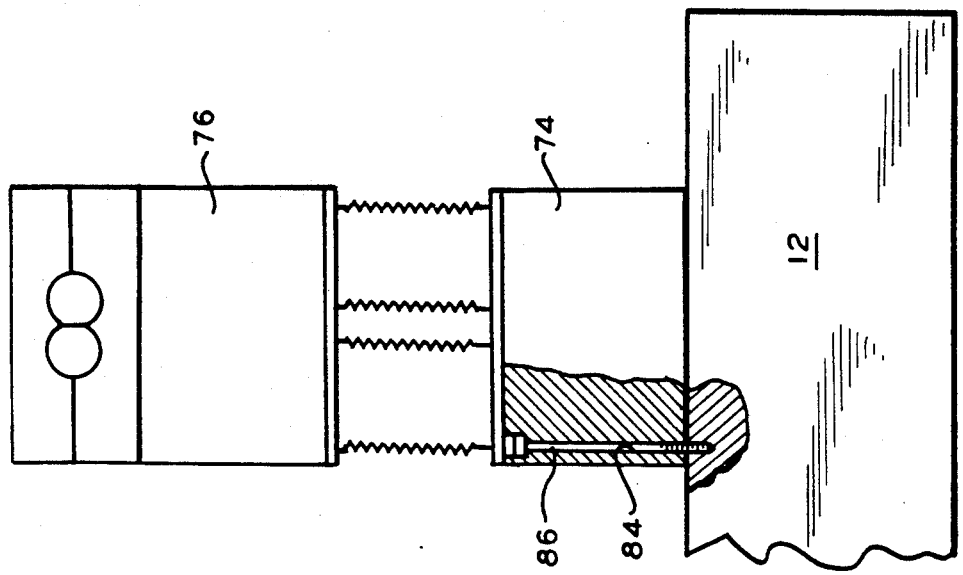
FIG. 5 is a cross-sectional elevational view through the plane 5—5 of FIG. 4.

As noted above, the upper and lower barrel sections 42, 44 of process section 36 are supported above baseframe 12 by a plurality of spring assemblies 46. The structural specifics of spring assembly 46 are disclosed hereinafter with particular reference to FIGS. 4 and 5. Thus, each spring assembly 46 can be seen to include a lower mounting block 74, an upper mounting block 76 and a spring 78 disposed between the two mounting blocks 74, 76.

More specifically lower mounting block 74 is a generally square member (in plan view) having an axial opening therethrough defined by a bore 80, an upper counterbore 81 and a lower counterbore 82. Also found in lower mounting block 74 are a plurality of throughbores 84 (only one shown, FIG. 5) which are adapted to receive therein machine bolts 86 which threadedly engage tapped bores in baseframe 12 to rigidly secure the lower mounting block 74 to baseframe 12. Similarly, there are formed in each lower mounting block 74 at least two throughbores 88 (FIG. 4) which are utilized in conjunction with guide pins 89 to accurately position lower mounting block 74 with respect to baseframe 12 in a manner well known to those skilled in these arts.

Rotatably received within bore 80 and lower counterbore 82 is a machine bolt 90 which is threadedly received within a tapped bore 91 formed in spring rod 92. Rod 92 is slideably received within the upper counterbore 81 of lower mounting block 74 and extends upwardly out of block 74 to be slideably received within upper mounting block 76.

In this regard, upper mounting block 76 is a generally square member (in plan view) having an axial bore 94 extending upwardly through a portion of its depth. Formed in the lower end of axial bore 94 is a counterbore 96 which is sized to receive therein a sleeve bearing 97. The inside diameter of sleeve bearing 97 is substantially equal to the diameter of bore 94 and the outside diameter of spring rod 92. Thus, spring rod 92 is suitably slideably received within bearing 97 and bore 94 depending upon the relative vertical positioning of upper mounting block 76 with respect to lower mounting block 74.

Secured to the upper surface of lower mounting block 74 is a cylindrical collar 99 which, with an annular channel 100 formed in the upper end of lower mounting block 74, cooperates to receive and retain the lower end of spring 78.

Secured to the lower end of upper mounting block 76 is a cylindrical collar 102 which cooperates with an annular bore 103 formed in the lower surface of upper mounting block 76 to receive and retain the upper end of spring 78.

Also formed in upper mounting block 76 are at least two throughbores 104 (one shown) which are adapted to receive guide pins 106 for locating and positioning the upper mounting block 76 with respect to lower barrel section 44 in the manner well known to those skilled in these arts.

When process section 36 is in the closed or processing position, the weight of upper barrel section 42 together with hydraulic cylinder assemblies 48 is supported by locating pins 39 and 68 through their respective support structures to baseframe 12. However, springs 78 are of sufficient strength and cooperate to support the combined weights of upper barrel section 42, hydraulic cylinder assemblies 48 and lower barrel section 44 during opening of process section 36. More specifically, as is discussed below in detail, opening of process section 36 is initiated by an upward movement of upper barrel section 42. When such movement occurs, all weight is taken off locating pins 39 and 68 and shifted to spring assemblies 46, which provide support for the entire process section until upper barrel section is lowered into operating position such as to once again engage locating pins 39 and 68.

Figure 4:
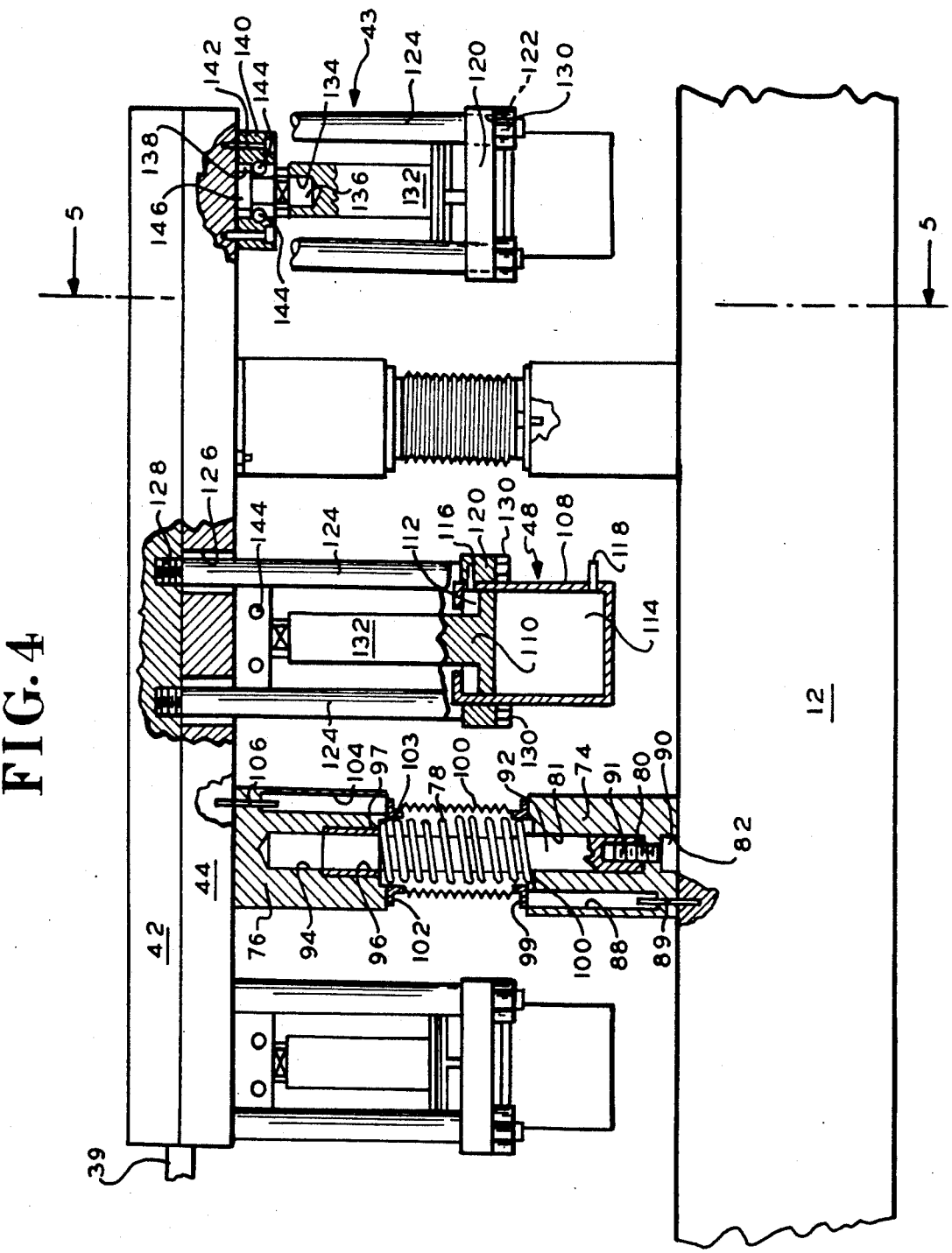
FIG. 4 is a partial elevational view, partly in cross-section, of the apparatus of FIG. 1.

It was also noted above that when it is desired or required to separate upper barrel section 42 from lower barrel section 44, e.g. for cleaning or to avoid build up of unacceptable or potentially catastrophic pressures or temperatures within the process section 36, vertical separation of the barrel sections is achieved through the operation of a plurality of hydraulic cylinder assemblies 48. In view of the fact that the structure and operation of each of hydraulic cylinder assemblies 48 is substantially identical, the structure and operation of each will be described in the context of two of the cylinder assemblies as shown in FIG. 4. It should be recognized, however, that the cylinder assemblies 48 depicted in FIG. 4 are depicted to a significant extent in schematic form. Those having ordinary skill in these arts will recognize that much detail, generally known, has been omitted.

Thus, hydraulic cylinder assembly 48, schematically, can be seen to consist of a fluid cylinder 108 reciprocally received within which is a piston 110. Cylinder 108 cooperates with piston 110 to define an upper fluid chamber 112 and a lower fluid chamber 114. It will be recognized by those skilled in these arts that the volumes of chambers 112 and 114 will vary depending upon the vertical position of piston 110 within cylinder 108.

Upper fluid chamber 112 is in fluid communication with the hydraulic control system of apparatus 10 through a hydraulic fluid line 116. Similarly, lower fluid chamber 114 is in fluid communication with the hydraulic control system of apparatus 10 through a hydraulic fluid line 118.

Fluid cylinder 108 is rigidly secured to a plate 120 in which are formed a plurality of bores 122. Bores 122 are adapted to slidably receive therethrough a plurality of tie-rods 124 which extend through bores 126 formed in lower barrel section 44 and which are threadedly received within tapped bores 128 formed in upper barrel section 42. The lower ends of tie rods 124 are threaded to receive nuts 130 thereon so as to rigidly secure the tie rods with respect to plate 120 and cylinder 108. Thus, through tie rods 124, fluid cylinder 108 and upper barrel section 42 are rigidly locked together as a single unit.

As noted above, piston 110 is reciprocally mounted within cylinder 108. Secured to or integral with piston 110 is piston rod 132 which extends upwardly out of upper fluid chamber 112. The upper end of rod 132 is provided with a tapped bore 134 within which is received a threaded coupling screw 136. Coupling screw 136 is received within the central bore 138 of a mounting plate 140 which is rigidly secured to the lower surface of lower barrel section 44 by machine screws 142.

As will be recognized by those skilled in these arts, rod 132 is secured to lower barrel section 44 by causing coupling screw 136 to be threaded into tapped bore 134 while the screw is received within central bore 138 of mounting plate 140. When coupling screw 136 has been properly threaded into rod 132, a pair of metal dowels 144 are inserted through openings in mounting plate 140 such as to cooperate with the head 146 of coupling screw 136 to preclude removal of the coupling screw 136 from the mounting plate 140. With the respective elements so assembled, piston rod 132 is rigidly secured to the lower barrel section 44.

Figure 6:
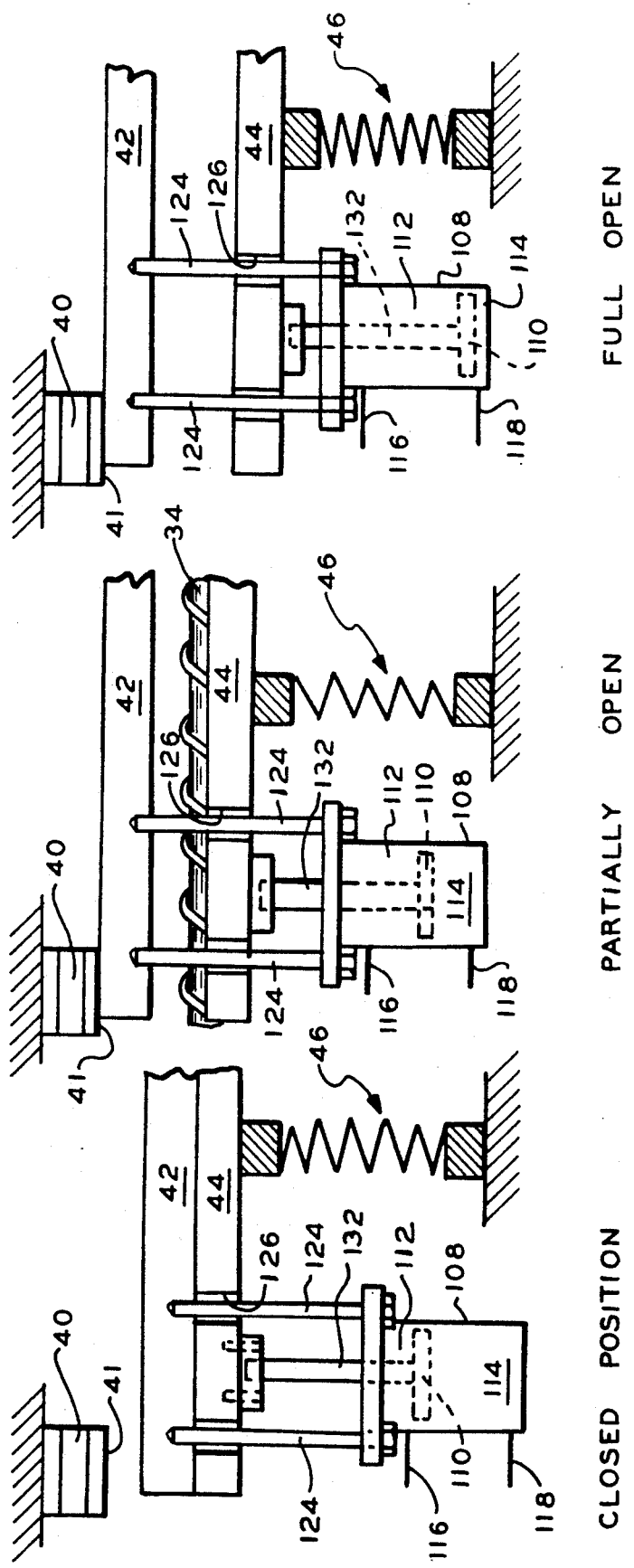
FIG. 6 is a schematic view of a portion of the apparatus of FIG. 1 showing relative positions of the apparatus of various operational conditions.

Considering now the operation of apparatus 10 to vertically displace upper and lower barrel sections 42, 44, reference is made to FIG. 6 which schematically shows the three basic operational positions of the upper and lower barrel sections 42, 44 between fully closed position and fully open position.

When upper and lower barrel sections 42, 44 are in the closed position the apparatus 10 is positioned for operation, i.e. processing of materials. Piston 110 is in its uppermost position, the lower surface of upper barrel section 42 is in planar contact with the upper surface of lower barrel section 44, upper barrel section 42 and hydraulic cylinder assemblies 48 are being supported by locating pins 39, 68, and spring assemblies 46 are carrying and supporting the full weight of lower barrel section 44.

Assume now that it is necessary to separate upper and lower barrel sections 42, 44. Such a requirement can result from a desire to clean the apparatus, from a need to open the apparatus to relieve excessive pressure or temperature developing as a result of processing materials, or for any of a number of other reasons. In such case, fluid is introduced to upper fluid chamber 112 through hydraulic fluid line 116. Although the normal tendency would be for piston 110 to be displaced downwardly within cylinder 108, the force of spring assembly 46 is sufficient to preclude any downward movement of lower barrel section 44, which is rigidly connected to piston rod 132 and piston 110, as a result of which fluid cylinder 108 is caused to be displaced upwardly. Because fluid cylinder 108 is rigidly secured to upper barrel section 42 through tie-rods 124, upward displacement of fluid cylinder 108 causes a corresponding upward displacement of upper barrel section 42 out of supporting contact with bearing pins 39, 68. The upward displacement of upper barrel section 42 continues until its upper surface makes substantially simultaneous contact with the lower surface 41 of first stop means 40 and the lower surface 64 of horizontal support plate 60 (FIG. 1). The position is shown schematically as the "partially open" position of FIG. 6.

With upper barrel section 42 restrained against further upward movement by reason of its engagement with surfaces 41 and 64, continued introduction of hydraulic fluid into upper fluid chamber 112 causes piston 110 to be displaced downwardly within fluid chamber 108. Such downward displacement of piston 110 causes a corresponding downward displacement of piston rod 132 and therewith lower barrel section 44 against the static force of springs 78. Such downward displacement continues until the elements are in the "Full Open" position as shown in FIG. 6.

Operating the apparatus from the "Full Open" position to the "Closed" position involves a mere reversal of the above-described sequence of events.

It will be recognized by those skilled in these arts that the foregoing structural and operational relationships permit separation of the upper and lower barrel section without any sliding or frictional relative movement between elements (including the barrel sections 42 and 44 relative to each other and each barrel section 42 and 44 relative to the screws 32 and 34); while in surface to surface engagement where such elements are exposed to the materials being processed. Such lack of relative movement is particularly critical where the materials being processed are volatile such as explosives and the like. Prior art mixing apparatus have been unsuitable for such applications because their operation or separation, e.g. for cleaning, has involved surface-to-surface frictional contact in areas exposed to the materials being processed. Typical of this is where the upper and lower barrel sections are hinged. In such cases, the friction generated by relative movement between the respective surfaces has been sufficient to cause detonation of the material being processed with catastrophic results. As earlier noted, separation of the barrel sections 42 and 44 by vertical movement of the upper section 42 reduces or eliminates the generation of high sheer stresses in materials being mixed within the barrel sections 42 and 44 by the screws 32 and 34.

It will also be recognized by those skilled in the art that the problem of avoiding an incidence of detonation relates not only to separation of the barrel sections in the ordinary course of operation such as for cleaning, but also in the extraordinary course of operation which may occur when a processing opertion deviates from acceptable conditions, e.g., extraordinarily high temperatures and/or pressures are generated or developing within bores 50 and 52. Under such circumstances it is desirable to separate upper and lower barrel sections 42, 40 as quickly as possible.

The hydraulic system for operating apparatus 10 may be one designed using known hydraulic techniques.

It will also be recognized by those skilled in these arts that upper and lower barrel sections 42, 44 may be provided with fluid passages for circulating cooling or heating fluids to control the temperature of processes being performed. Sensors may be provided to measure process pressures and temperatures at various points in the process sections. All of such sensors are well recognized by those skilled in these arts to be usable and available.

An additional unique feature of the present invention is the provision of locking means for locking piston rods 132 of the hydraulic cylinder assemblies 48 in a particular desired position.

Figure 7:
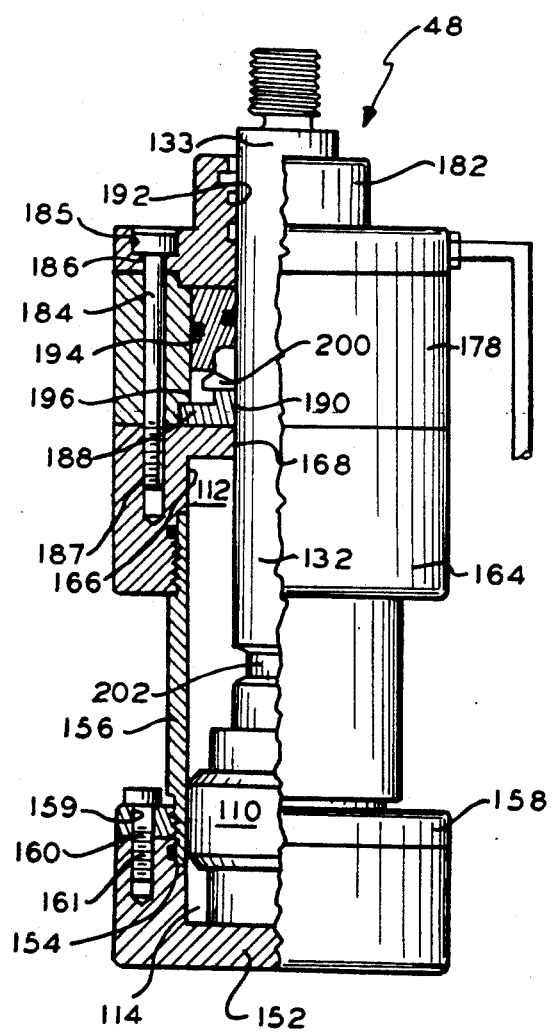
FIG. 7 is an elevational view, partly in section showing a locking means for the present invention in the unlocked position.
Figure 8:
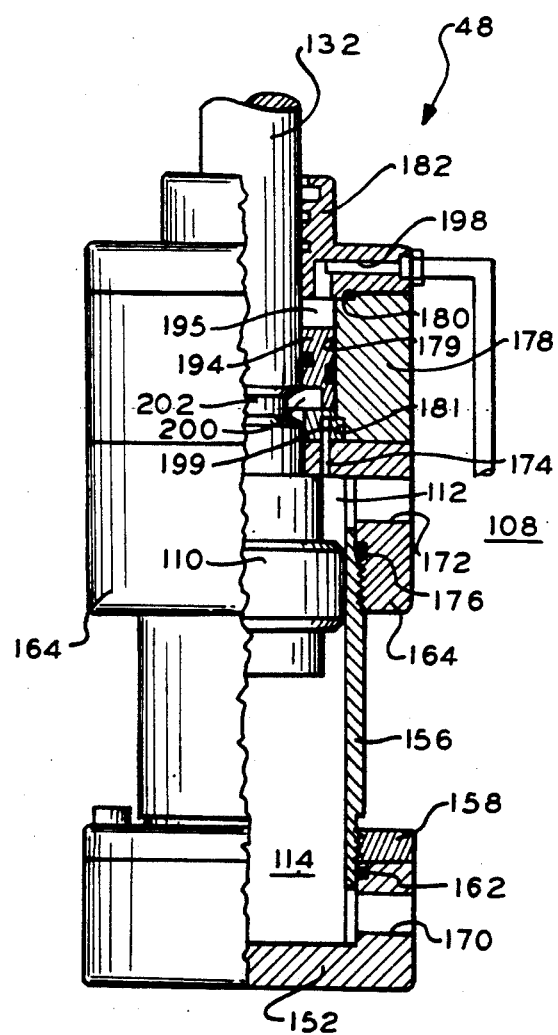
FIG. 8 is a view similar to FIG. 7 showing a locking means for the present invention in the locked position.

In this regard, FIGS. 7 and 8 depict one of hydraulic cylinder assemblies 48, partly in section, showing locking structure for retaining the apparatus in the closed or operational position, i.e. the position which corresponds to that shown in FIG. 6 "Closed Position." It will also be recognized by those skilled in these acts that substantially identical locking structures may be utilized to retain the apparatus in the "Open Position" as shown in FIG. 7.

Referring therefore to FIGS. 7 and 8 which show more of the construction of hydraulic cylinder assemblies 48 than the schematics of FIG. 6, fluid cylinder 108 as designated in FIG. 6 can be seen to include a lower cylinder head 152 having a bore 154 within which is slidably received the lower end of a cylinder body 156. Cylinder body 156 is externally threaded adjacent its lower end for threadedly receiving a lower retaining ring 158. A plurality of axially extending bores 159 (one shown) are found through retaining ring 158 to accomodate the passage therethrough of machine screws 160 which are threadedly received in tapped bores 161 formed in lower head 152. The inner surface of bore 154 is relieved to define an annular channel for receiving an O-ring seal 162 which is in surface-to-surface engagement with the outer surface of cylinder body 156 so as to provide a fluid tight seal between lower cylinder head 152 and cylinder body 156.

The upper end of cylinder body 156 is also externally threaded for receiving an upper retaining ring 164. Formed in upper retaining ring 164 is a first axially extending bore 166 which cooperates with the inner surface of cylinder body 156 to define the upper portion of upper fluid chamber 112. Also formed in upper retaining ring 164 is a second axially extending bore 168 which is sized to permit the sliding passage therethrough of piston rod 132.

Hydraulic fluid may pass into and from lower fluid chamber 114 through a radially extending passage 170 (and the fluid line 118) formed in lower head 152. Similarly, hydraulic fluid may pass into and from upper fluid chamber 112 through a radially extending passage 172 (and the fluid line 116) formed in upper retaining ring 164. Also formed in upper retaining ring 164 is an axially extending passage 174 which permits flow of hydraulic fluid into and out of upper fluid chamber 112 from above retaining ring 164 as is discussed below.

An O-ring seal 176 is provided in a suitable channel found in the inner surface of upper retaining ring 164 to preclude leakage of hydraulic fluid outwardly from upper fluid chamber 112 between the upper outer surface of cylinder body 156 and the inner surface of upper retaining ring 164.

Disposed above upper retaining ring 164 is an upper cylinder body 178 in which are formed an axially extending bore 179, an upper axially extending counterbore 180 and a lower axially extending counterbore 181.

Disposed above upper cylinder body 178 is an upper head 182 which is rigidly secured to upper cylinder body 178 and upper retaining ring 164 by a plurality of machine screws 184 (one shown) which extend through radially spaced axially extending bores 185 and 186 formed in upper head 182 and upper cylinder body 178, respectively, and are threadedly received within tapped bores 187 found in upper retaining ring 164.

Mounted within upper cylinder body 178 is a collar 188 the lower surface of which rests on the upper surface of upper retaining ring 164 and the outer surface of which is received within the channel defined by lower counterbore 181 so as to be firmly retained in position. Collar 188 is provided with an axial throughbore 190 which is sized to slidably receive piston rod 132 therethrough. Similarly, upper head 182 is provided with an axial throughbore 192 which is sized to slidably receive piston rod 132 therethrough.

The lower surface of upper head 182, the inner surface of upper cylinder body 178 and the upper surface of collar 188 cooperate to define a fluid chamber within which is received a free floating, cylindrical piston 194 which is slidable on piston rod 132. Piston 194 separates the fluid chamber into an upper portion 195 (FIG. 8) and a lower portion 196 (FIG. 7). Passage of hydraulic fluid between upper chamber portion 195 and lower chamber portion 196 as well as out of the upper and lower chamber portions 195 and 196 is precluded with suitably positioned O-rings in the well known manner.

Upper cylinder portion 195 is in hydraulic fluid communication with lower fluid chamber 114 through a fluid passage 198 formed in upper head 182 and suitable hydraulic piping (not shown). Lower cylinder portion 196 is in hydraulic fluid communication with upper fluid chamber 112 through passage 174 in upper retaining ring 164 and a coaxial passage 199 formed in collar 188.

The lower surface of free-floating piston 194 is machined to define a camming surface which cooperates with the upper surface of a lock ring 200 to selectively lock or unlock the piston rod 132 in response to particular hydraulic conditions as is discussed below.

Lock ring 200 may be a split ring structure which may be spread to accomodate the passage therethrough of piston rod 132 and which may be compressed to be received within an annular channel 202 formed in the surface of piston rod 132. As may be seen from the drawings, the upper surface of lock ring 200 is tapered to correspond to the frusto-conical upper surface of channel 202.

Considering now the operation of the unique locking means, it can be seen that when the apparatus 10 is in the full open position, piston 110 is at the bottom of cylinder body 156 and the annular channel 202 of piston rod 132 is disposed within upper fluid chamber 112. At the same time, free floating piston 194 is at its uppermost position and lock ring 200 is spread to permit the slidable passage therethrough of piston rod 132.

When operation of the apparatus calls for upper and lower barrel sections 42, 44 to be moved to the closed position, pressurized hydraulic fluid is introduced into lower fluid chamber 114 and upper portion 195 through passages 170 and 198 respectively. Introduction of fluid in this manner initially causes cylinder 108 to be displayed downwardly and piston 110 to be displaced upwardly and tends to push free floating piston 194 downwardly. As more hydraulic fluid is introduced, cylinder 108 is displayed downwardly and piston 110 and therewith piston rod 132 are displaced upwardly without any movement of free floating piston 194 until the upper surface of annular channel 202 is adjacent the upper surface of lock ring 200. At this position the lock ring 200 may be compressed so as to be received within annular channel 202. This compression occurs by the displacement of free floating piston 194 downwardly such as to cam the lock ring 200 into compressed position within channel 202. With the lock ring 200 in this position, piston rod 132 is precluded from further axial movement. Further, so long as an excess of hydraulic pressure is maintained in upper portion 195, the lock ring will remain in the compressed, locking position.

When it is desired to open apparatus 10, hydraulic pressure within upper portion 195 and lower fluid chamber 114 is relieved and pressurized fluid is introduced into upper fluid chamber 112 through passage 172. Such fluid also passes upwardly through passages 174 and 181 such as to displace free-floating piston 194 upwardly and away from lock ring 200. With piston 194 so upwardly disposed, lock ring 200 is free to expand out of channel 202 and this is achieved by the camming action of the upper surface of the channel 202 against the upper surface of lock ring 200 as the cylinder 108 moves upwardly and piston rod 132 is displaced downwardly by continued introduction of pressurized fluid into upper fluid chamber 112.

The above described structure thus provides a locking means which insures retention of the barrel sections in closed position so long as the correct hydraulic pressure relationships are maintained.

If desired, similar locking means may also be provided to retain this barrel section in open position. This may be beneficial as a safety measure to preclude closing of this apparatus during maintenance.

It will further be recognized by those skilled in these arts that many modifications and variations to the disclosed preferred embodiment of the invention may be made without departing from the spirit and scope thereof.

I claim:

1. Apparatus for the continuous mixing of material, comprising:
   drive means;
   a processing section, said processing section comprising a first barrel section and a second barrel section, said first and second barrel sections cooperating to define at least one bore within which to mix said material, and means associated with said at least one bore for permitting entry of said material into said bore and exiting of said material from said bore, said first and second barrel sections being displaceable between a closed or operating position, in which respective mating surfaces are in surface-to-surface engagement, and an open position, in which the respective mating surfaces are spaced apart;
   at least one mixing screw operatively connected to said drive means and extending into said at least one bore defined by said first and second barrel sections; and
   means for displacing said first and second barrel sections between said closed position and said open position such that the mating surfaces experience no sliding, relative movement parellel thereto.

2. Apparatus according to claim 1 wherein said means for displacing said first and second barrel sections is secured to and supported by said first barrel section.

3. Apparatus according to claim 1 including first means for supporting said first barrel section when in said closed position and second means for supporting said first barrel section when in any position other than said closed position.

4. Apparatus according to claim 3 wherein said second means for supporting said first barrel section comprises at least one spring assembly.

5. Apparatus according to claim 3 wherein said second means for supporting said first barrel section is rigidly secured to said second barrel section.

6. Apparatus according to 3 wherein said means for displacing said first and second barrel sections is secured to and supported by said first barrel section.

7. Apparatus according to claim 6 including means for engaging said first barrel section to limit displacement of said first barrel section away from said second barrel section.

8. Apparatus according to claim 7 wherein displacement of said second barrel section away from said first barrel section occurs only subsequent to engagement of said first barrel section with said means for engaging.

9. Apparatus according to claim 4 wherein said means for displacing said first and second barrel sections includes at least one hydraulic cylinder assembly operatively secured to said first and second barrel sections.

10. Apparatus according to claim 1 including means for locking said first and second barrel sections in at least one of said closed and open positions.

11. Apparatus according to claim 9 including means for locking said first and second barrel sections in at least one of said closed and open positions.

12. Apparatus according to claim 11 wherein said hydraulic cylinder assembly includes a piston rod and wherein said means for locking comprises a means responsive to hydraulic pressure for precluding movement of said piston rod within said hydraulic cylinder assembly.

* * * * *